United States Patent
Dam Nielsen

(10) Patent No.: US 9,031,532 B2
(45) Date of Patent: May 12, 2015

(54) MOVEMENT ACTIVATED KEY GUARD

(75) Inventor: Peter Dam Nielsen, Lyngby (DK)

(73) Assignee: Nokia Technologies Oy, Espoo (FI)

( * ) Notice: Subject to any disclaimer, the term of this patent is extended or adjusted under 35 U.S.C. 154(b) by 1058 days.

(21) Appl. No.: 10/593,818

(22) PCT Filed: Mar. 25, 2004

(86) PCT No.: PCT/IB2004/000895
§ 371 (c)(1),
(2), (4) Date: Jul. 13, 2007

(87) PCT Pub. No.: WO2005/094047
PCT Pub. Date: Oct. 6, 2005

(65) Prior Publication Data
US 2008/0032680 A1    Feb. 7, 2008

(51) Int. Cl.
*H04M 1/67* (2006.01)
*H04M 1/725* (2006.01)

(52) U.S. Cl.
CPC ............ *H04M 1/67* (2013.01); *H04M 1/72519* (2013.01); *H04M 2250/12* (2013.01)

(58) Field of Classification Search
CPC ....... H04M 1/67; H04M 1/673; H04W 12/02; H04W 12/06; H04W 4/008
USPC ............ 455/418, 403, 410–411, 550.1, 574; 379/433.06, 433.07
See application file for complete search history.

(56) References Cited

U.S. PATENT DOCUMENTS

| | | | |
|---|---|---|---|
| 5,809,123 A | 9/1998 | Reynolds | |
| 5,924,046 A | 7/1999 | Martensson | |
| 6,172,607 B1 * | 1/2001 | McDonald | 340/571 |
| 6,449,492 B1 * | 9/2002 | Kenagy et al. | 455/550.1 |
| 6,529,144 B1 * | 3/2003 | Nilsen et al. | 341/20 |
| 6,549,792 B1 * | 4/2003 | Cannon et al. | 455/550.1 |
| 6,662,026 B1 | 12/2003 | Cordray et al. | |
| 7,024,228 B2 * | 4/2006 | Komsi et al. | 455/566 |
| 7,130,583 B2 * | 10/2006 | Skorpik | 455/41.2 |
| 7,400,878 B2 * | 7/2008 | Hassan et al. | 455/410 |
| 7,498,951 B2 * | 3/2009 | Wardimon | 340/691.3 |
| 2003/0045274 A1 * | 3/2003 | Nishitani | 455/414 |
| 2005/0046580 A1 * | 3/2005 | Miranda-Knapp et al. | 340/686.1 |
| 2006/0293041 A1 * | 12/2006 | Kim | 455/418 |

FOREIGN PATENT DOCUMENTS

| | | | |
|---|---|---|---|
| EP | 1 063 837 A2 | 12/2000 | |
| EP | 1 109 382 A2 | 6/2001 | |
| EP | 1109382 A2 * | 6/2001 | ............ H04M 1/725 |
| GB | 2 386 298 A | 9/2003 | |

OTHER PUBLICATIONS

Office Action in European Patent Application No. 0472368, dated Feb. 4, 2011.

* cited by examiner

*Primary Examiner* — George Eng
*Assistant Examiner* — Nam Huynh
(74) *Attorney, Agent, or Firm* — Banner & Witcoff, Ltd.

(57) ABSTRACT

A user is prevented from accidentally activating a mobile telephone (101). By detecting a change of state of motion of the telephone, followed by determining an absence of user-induced activity in the telephone and, depending on the detected change of state of motion and depending on the determined absence of user-induced activity, an input means-lock function in the telephone is activated.

20 Claims, 2 Drawing Sheets

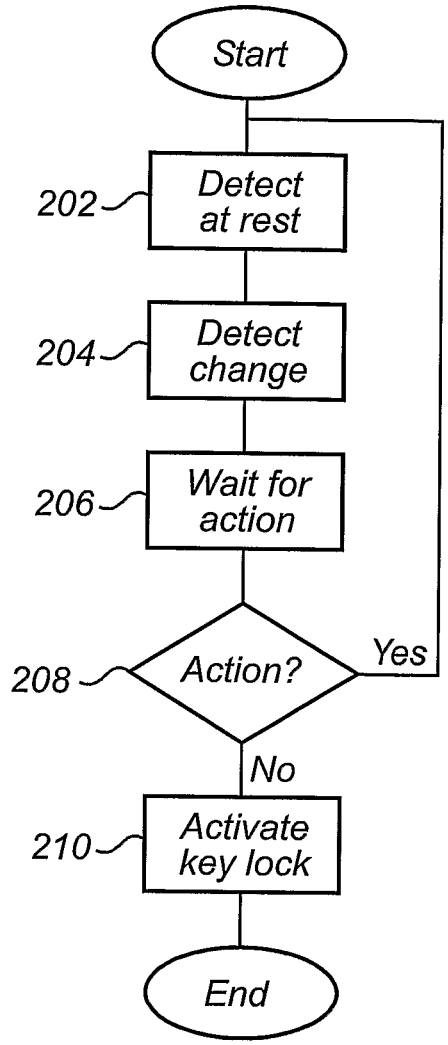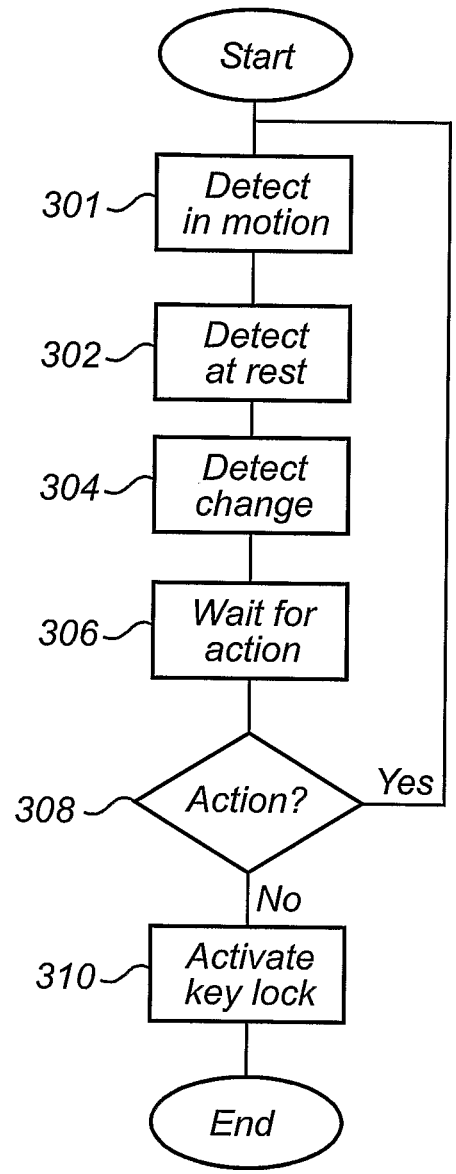
Fig. 2
Fig. 3

MOVEMENT ACTIVATED KEY GUARD

This is a U.S. national stage of PCT/IB2004/000895, filed on Mar. 25, 2004, the contents of which are incorporated by reference herein.

FIELD OF THE INVENTION

The present invention relates to preventing a user from activating a mobile telephone by accidental manipulation of input means of the telephone.

BACKGROUND

Mobile telephones of today are typically small and have a multitude of means for user input, including keypad keys, virtual keys on touch sensitive display screens as well as other buttons and dial-type means. These means for user input are usually distributed spatially all over the telephone and a user handling the telephone need always to be careful not to accidentally manipulate these input means, since this may lead to unwanted activation of telephone functions.

Telephones according to prior art are usually equipped with some sort of key lock function, which is selectively activated by a user through manual procedures such as selecting the key lock function from a menu by way of pressing a number of keys in a predetermined sequence. Needless to say, such a manual procedure has a drawback in that it is necessary for the user to remember to manually activate the key lock when, e.g., putting the telephone in his/her pocket or stowing the telephone in a bag etc.

Another way of locking the keys according to prior art is by means of an automatic time-out function. That is, the keys on the telephone are locked when a predetermined time interval has lapsed since any key has been pressed or manipulated. Such a solution has a drawback in that it is not very flexible in that the keys will be locked unconditionally, irrespective of the intentions and wishes of the user.

SUMMARY OF THE INVENTION

The object of the invention is hence to overcome drawbacks related to solutions according to prior art by improving flexibility for a user wishing to have a telephone with a key lock function.

This object is achieved by way of a method according to claim 1, a telephone according to claim 7 and a computer program according to claim 10.

Hence, an inventive method of preventing a user from activating a mobile telephone by accidental manipulation of input means of the telephone, comprises the steps of detecting a change of state of motion of the telephone, followed by determining an absence of user-induced activity in the telephone. Depending on the detected change of state of motion and depending on the determined absence of user-induced activity, an input means-lock function in the telephone is then activated.

This has the advantage of providing the desired flexibility for the user, in contrast to the lack of flexibility as discussed above in connection with prior art solutions.

In a preferred embodiment the detection of a change of state of motion comprises detecting that the telephone is substantially at rest, followed by detecting that the telephone is in motion.

Preferably, the determination of an absence of user-induced activity in the telephone includes monitoring, during a first predetermined time period, any activity induced by a user and, when said first time period has lapsed and user-induced activity has not been detected, establishing the absence of user-induced activity.

The inventive method may, in another preferred embodiment commence with detecting a change of state of motion of the telephone, from a state in which the telephone is in motion, to a state in which the telephone is substantially at rest and, having detected that the telephone is substantially at rest, continuing with the steps as described above.

This has the advantage of providing flexibility in a situation where a telephone is constantly being moved around, put down, picked up again etc., such as when the telephone is being passed between different users when viewing a picture or a message on the display of the telephone.

Preferably, the step of detecting that the telephone is substantially at rest includes monitoring, during a second predetermined time period, any motion of the telephone and, when said second time period has lapsed and motion of the telephone has not been detected, establishing that the telephone is substantially at rest.

The actual detection of motion preferably includes detecting acceleration in any spatial direction.

BRIEF DESCRIPTION OF THE DRAWINGS

FIG. 2 is a flow chart illustrating a number of steps of a method according to a first embodiment of the present invention.

FIG. 3 is a flow chart illustrating a number of steps of a method according to a second embodiment of the present invention.

PREFERRED EMBODIMENTS

Figure 1:
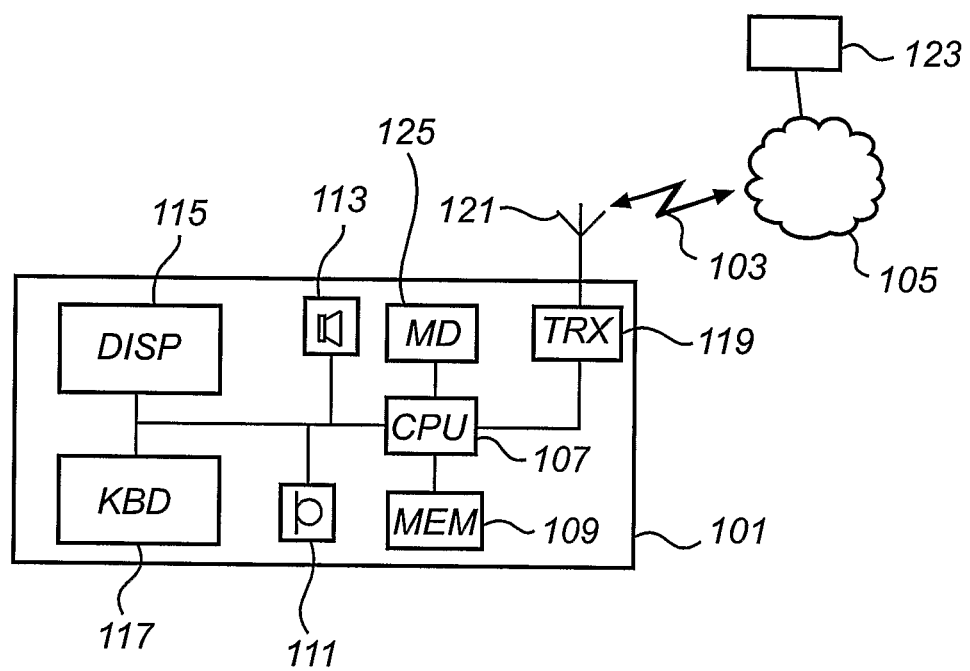
FIG. 1 shows schematically a block diagram of a mobile telephone according to the present invention.

FIG. 1 illustrates schematically a mobile telephone 101 in which the present invention is implemented. The telephone 101 is capable of communication via an air interface 103 with a radio communication system 105 such as the well known systems GSM/GPRS, UMTS, CDMA 2000 etc. The terminal comprises a processor 107, memory 109 as well as input/output units in the form of a microphone 111, a speaker 113, a display 115 and a keyboard 117. Radio communication is realized by radio circuitry 119 and an antenna 121. The details regarding how these units communicate are known to the skilled person and is therefore not discussed further. In addition, the terminal comprises a motion detector 125, e.g. in the form of an accelerometer capable of providing both qualitative and quantitative information regarding any spatial motion, in any spatial direction, of the terminal 101. However, more simple motion detection means are also feasible, such as a mercury switch or the equivalent, as the skilled person will realize.

The communication terminal 101 may for example be a mobile telephone terminal in a cellular or non-cellular, i.e. cordless, communication system or a PDA equipped with radio communication means. The methods according to the different embodiments of the present invention will in general reside in the form of software instructions, together with other software components necessary for the operation of the terminal 101, in the memory 109 of the terminal 101. The software will be executed by the processor 107, which will receive and process input data from all other units in the telephone, including the motion detector 125.

FIG. 2 is a flow chart of a method according to the present invention, representing a scenario in which the user has picked up the telephone and, instead of making a call, putting the telephone in his/her pocket.

During an initial detection step 202, the state of motion of the telephone is monitored in a repetitive manner and as long as the telephone is found not to be at rest, the detection step 202 continues to monitor the state of motion. When it has been found that the telephone has been at rest during a predetermined time period, e.g. a few seconds, rest is considered to be present and the method continues to a step of detecting a change of state of motion 204.

During step 204 the state of motion of the telephone is monitored in a repetitive manner and as long as it is detected that the telephone is at rest, the detection step 204 continues. When a change of state occurs, i.e. motion is detected, the method continues to a step 206 of waiting for a user-induced action.

During the waiting for action step 206, the telephone is monitored in a repetitive manner during a predetermined period of time, and in a checking step 208 a check is made whether or not a user induced action was detected during the predetermined time period.

If user-induced action is detected, which would be the case in a scenario where the user has picked up the phone and, e.g., starts placing a call, the method returns to the initial step 202 of detecting whether or not the telephone is at rest.

If no user-induced action is detected in step 206 and 208, the method continues to a key lock activation step 210, during which input means of the telephone are locked and thereby the telephone is prevented from being accidentally manipulated by the user or by any other mechanical effect.

Turning now to FIG. 3, a second preferred embodiment of a method according to the present invention will be described. For example, FIG. 3 illustrates how the invention can handle locking of the keys in a scenario during which a telephone is constantly being moved around, put down, picked up again etc., such as when the telephone is being passed between different users when viewing a picture or a message on the display of the telephone.

Initially, during a motion detection step 301, the state of motion of the telephone is monitored in a repetitive manner and as long as the telephone is found to be at rest, the detection step 301 continues to monitor the state of motion. When it has been found that the telephone has been in motion during a predetermined time period, e.g. a few seconds, motion of the telephone is considered to be present and the method continues to a rest detection step 302.

During the rest detection step 302, the state of motion of the telephone is monitored in a repetitive manner and as long as the telephone is found not to be at rest, the rest detection step 302 continues to monitor the state of motion. When it has been found that the telephone has been at rest during a predetermined time period, e.g. a few seconds, rest is considered to be present and the method continues to a step of detecting a change of state of motion 304.

During step 304 the state of motion of the telephone is monitored in a repetitive manner and as long as it is detected that the telephone is at rest, the detection step 304 continues. When a change of state occurs, i.e. motion is detected, the method continues to a step 306 of waiting for a user-induced action.

During the waiting for action step 306, the telephone is monitored in a repetitive manner during a predetermined period of time, and in a checking step 308 a check is made whether or not a user induced action was detected during the predetermined time period.

If user-induced action is detected, which would be the case in a scenario where a viewer desires, e.g., to change the properties of the display on the phone, the method returns to the initial step 301 of detecting whether or not the telephone is in motion.

If no user-induced action is detected in step 306 and 308, the method continues to a key lock activation step 310, during which input means of the telephone are locked and thereby the telephone is prevented from being accidentally manipulated by the user or by any other mechanical effect.

It is to be noted that monitoring of motion and rest can be done passively by having an interrupt or event handler and some counters with associated interrupts and interrupt handler functions. The motion detector (accelerometer) is set to trigger an interrupt or event (cf. step 301) and when this interrupt is triggered a rest counter is reset. When this rest trigger reaches a certain number or level, another interrupt or event is triggered and the rest state is entered (cf. step 302). When the motion interrupt is triggered while the phone is in the rest state the phone enters an active state (cf. step 303) and another counter (activity counter), or possibly the same, is started and reset (cf. step 306). As this counter reaches a certain number or level an interrupt is triggered (cf. step 308—NO) and the interrupt handler activates the key lock function (cf. step 310). If a user induced action should take place while in the active state the activity counter is deleted and also its interrupt handler function (cf. step 308—YES). Thereby the motion and rest states of the phone can be both passively and actively monitored.

The invention claimed is:

1. A method comprising:
monitoring, by a mobile communication terminal and for a first predetermined time period, for motion of the mobile communication terminal;
responsive to an absence of motion of the mobile communication terminal during the first predetermined time period, determining, by the mobile communication terminal, that the mobile communication terminal is in a state of rest corresponding to a user of the mobile communication terminal putting down the mobile communication terminal;
detecting, by the mobile communication terminal, a change of state of motion of the mobile communication terminal from the state of rest to a state of motion corresponding to the user of the mobile communication terminal picking up the mobile communication terminal;
responsive to detecting the change of state of motion, monitoring, by the mobile communication terminal and for a second predetermined time period, an input unit of the mobile communication terminal for; and
responsive to an absence of input during the second predetermined time period, activating, by the mobile communication terminal, an input lock of the mobile communication terminal to prevent accidental manipulation of the input unit.

2. The method of claim 1, wherein the mobile communication terminal comprises an accelerometer, and wherein monitoring for the motion of the mobile communication terminal comprises monitoring for motion of the mobile communication terminal detected by the accelerometer.

3. The method of claim 1, wherein the mobile communication terminal comprises a mercury switch, and wherein monitoring for the motion of the mobile communication terminal comprises monitoring for motion of the mobile communication terminal detected by the mercury switch.

4. The method of claim 1, wherein the input unit of the mobile communication terminal comprises a display, and wherein monitoring the input unit of the mobile communication terminal for the input comprises monitoring the display for the input.

5. The method of claim 1, wherein the input unit of the mobile communication terminal comprises a keyboard, and wherein monitoring the input unit of the mobile communication terminal for the input comprises monitoring the keyboard for the input.

6. The method of claim 1, wherein the input unit of the mobile communication terminal comprises a microphone, and wherein monitoring the input unit of the mobile communication terminal for the input comprises monitoring the microphone for the input.

7. The method of claim 1, wherein the mobile communication terminal comprises a motion detector, the method comprising:
triggering, by the motion detector, an interrupt configured to reset a rest counter;
responsive to the rest counter reaching a level corresponding to the first predetermined time period, triggering, by the rest counter, an interrupt configured to cause the mobile communication terminal to determine that the mobile communication terminal is in the state of rest;
triggering, by the motion detector, an interrupt configured to reset an activity counter; and
responsive to the activity counter reaching a level corresponding to the second predetermined time period, triggering, by the activity counter, an interrupt configured to cause the mobile communication terminal to activate the input lock.

8. A mobile communication terminal comprising:
at least one processor; and
a memory storing instructions that when executed by the at least one processor cause the mobile communication terminal to:
monitor, for a first predetermined time period, for motion of the mobile communication terminal;
responsive to an absence of motion of the mobile communication terminal during the first predetermined time period, determine that the mobile communication terminal is in a state of rest corresponding to a user of the mobile communication terminal putting down the mobile communication terminal;
detect a change of state of motion of the mobile communication terminal from the state of rest to a state of motion corresponding to the user of the mobile communication terminal picking up the mobile communication terminal;
responsive to detecting the change of state of motion, monitor, for a second predetermined time period, an input unit of the mobile communication terminal for input; and
responsive to an absence of input during the second predetermined time period, activate an input lock of the mobile communication terminal to prevent accidental manipulation of the input unit.

9. The mobile communication terminal of claim 8, wherein the mobile communication terminal comprises an accelerometer, and wherein the instructions, when executed by the at least one processor, cause the mobile communication terminal to monitor for motion of the mobile communication terminal detected by the accelerometer.

10. The mobile communication terminal of claim 8, wherein the mobile communication terminal comprises a mercury switch, and wherein the instructions, when executed by the at least one processor, cause the mobile communication terminal to monitor for motion of the mobile communication terminal detected by the mercury switch.

11. The mobile communication terminal of claim 8, wherein the input unit of the mobile communication terminal comprises a display, and wherein the instructions, when executed by the at least one processor, cause the mobile communication terminal to monitor the display for the input.

12. The mobile communication terminal of claim 8, wherein the input unit of the mobile communication terminal comprises a keyboard, and wherein the instructions, when executed by the at least one processor, cause the mobile communication terminal to monitor the keyboard for the input.

13. The mobile communication terminal of claim 8, wherein the input unit of the mobile communication terminal comprises a microphone, and wherein the instructions, when executed by the at least one processor, cause the mobile communication terminal to monitor the microphone for the input.

14. The mobile communication terminal of claim 8, wherein the mobile communication terminal comprises a motion detector, and wherein the instructions, when executed by the at least one processor, cause:
the motion detector to trigger an interrupt configured to reset a rest counter;
the rest counter to, responsive to reaching a level corresponding to the first predetermined time period, trigger an interrupt configured to cause the mobile communication terminal to determine that the mobile communication terminal is in the state of rest;
the motion detector to trigger an interrupt configured to reset an activity counter; and
the activity counter to, responsive to reaching a level corresponding to the second predetermined time period, trigger an interrupt configured to cause the mobile communication terminal to activate the input lock.

15. One or more non-transitory computer-readable media comprising instructions that when executed by at least one processor of a mobile communication terminal cause the mobile communication terminal to:
monitor, for a first predetermined time period, for motion of the mobile communication terminal;
responsive to an absence of motion of the mobile communication terminal during the first predetermined time period, determine that the mobile communication terminal is in a state of rest corresponding to a user of the mobile communication terminal putting down the mobile communication terminal;
detect a change of state of motion of the mobile communication terminal from the state of rest to a state of motion corresponding to the user of the mobile communication terminal picking up the mobile communication terminal;
responsive to detecting the change of state of motion, monitor, for a second predetermined time period, an input unit of the mobile communication terminal for input; and
responsive to an absence of input during the second predetermined time period, activate an input lock of the mobile communication terminal to prevent accidental manipulation of the input unit.

16. The one or more non-transitory computer-readable media of claim 15, wherein the mobile communication terminal comprises an accelerometer, and wherein the instructions, when executed by the at least one processor, cause the mobile communication terminal to monitor for motion of the mobile communication terminal detected by the accelerometer.

17. The one or more non-transitory computer-readable media of claim 15, wherein the input unit of the mobile communication terminal comprises a display, and wherein the instructions, when executed by the at least one processor, cause the mobile communication terminal to monitor the display for the input.

18. The one or more non-transitory computer-readable media of claim 15, wherein the input unit of the mobile communication terminal comprises a keyboard, and wherein the instructions, when executed by the at least one processor, cause the mobile communication terminal to monitor the keyboard for the input.

19. The one or more non-transitory computer-readable media of claim 15, wherein the input unit of the mobile communication terminal comprises a microphone, and wherein the instructions, when executed by the at least one processor, cause the mobile communication terminal to monitor the microphone for the input.

20. The one or more non-transitory computer-readable media of claim 15, wherein the mobile communication terminal comprises a motion detector, and wherein the instructions, when executed by the at least one processor, cause:
- the motion detector to trigger an interrupt configured to reset a rest counter;
- the rest counter to, responsive to reaching a level corresponding to the first predetermined time period, trigger an interrupt configured to cause the mobile communication terminal to determine that the mobile communication terminal is in the state of rest;
- the motion detector to trigger an interrupt configured to reset an activity counter; and
- the activity counter to, responsive to reaching a level corresponding to the second predetermined time period, trigger an interrupt configured to cause the mobile communication terminal to activate the input lock.

* * * * *

UNITED STATES PATENT AND TRADEMARK OFFICE
CERTIFICATE OF CORRECTION

| | |
|---|---|
| PATENT NO. | : 9,031,532 B2 |
| APPLICATION NO. | : 10/593818 |
| DATED | : May 12, 2015 |
| INVENTOR(S) | : Peter Dam Nielsen |

Page 1 of 1

It is certified that error appears in the above-identified patent and that said Letters Patent is hereby corrected as shown below:

In the Claims

In Column 4, Claim 1, Line 50
Please delete "terminal for;" and replace with --terminal for input;--.

Signed and Sealed this
Tenth Day of November, 2015

Michelle K. Lee
*Director of the United States Patent and Trademark Office*